United States Patent [19]

O'Hara

[11] Patent Number: 5,628,439
[45] Date of Patent: May 13, 1997

[54] PORTABLE DESK AND FILE HOLDER FOR USE IN A SEAT

[76] Inventor: Timothy P. O'Hara, 640 A. Reeds Ave., Red Bluff, Calif. 96080

[21] Appl. No.: 566,720

[22] Filed: Dec. 4, 1995

[51] Int. Cl.$^6$ .............................. B60R 7/04; A47B 37/00
[52] U.S. Cl. .................... 224/275; 224/553; 224/563; 108/25; 108/44; 248/99; 248/100
[58] Field of Search .................... 224/275, 563, 224/564, 553; 108/44, 25; 248/100, 99; 383/9, 13, 23, 14

[56] References Cited

U.S. PATENT DOCUMENTS

| | | |
|---|---|---|
| 3,345,118 | 10/1967 | Cummings . |
| 4,832,241 | 5/1989 | Radcliffe . |
| 4,928,865 | 5/1990 | Lorence et al. . |
| 4,949,890 | 8/1990 | Schultz . |
| 5,092,507 | 3/1992 | Szablak et al. .......................... 224/275 |
| 5,479,866 | 1/1996 | Rae ...................................... 108/44 |
| 5,551,616 | 9/1996 | Stitt et al. ............................. 224/275 |
| 5,560,676 | 10/1996 | Griffith et al. ........................ 224/275 |

Primary Examiner—Linda J. Sholl

[57] ABSTRACT

A portable desk and cooperative file folder holder for use in a vehicle seat or house chair. When used in a vehicle, the desk and file holder are placed in the passenger seat next to the driver. The desk includes a horizontally disposed rectangular base member which rests on the seat when in use, and a back member pivotally attached to the base member and which rests vertically disposed adjacent the back rest of the seat when in use. The back member is lockable into the vertical position. The base member serves as a work surface for papers or a note book computer and the like, and to support the back member. The back member serves to removably support and stabilize a file holder. The file holder is structured and positioned to orient held files so that the file identification tabs commonly at the top of each file are facing the driver seat. The file holder is readily removable from the back member and balance of the desk structure, and is structured with carrying handles to be readily transportable along with its contained files and other business items to a site remote of the vehicle absent the balance of the desk structure having to be removed from the vehicle and transported. The balance of the desk structure, which is foldable for compact storage, is also readily transportable from the vehicle, being separately hand portable from the file holder.

4 Claims, 5 Drawing Sheets

PORTABLE DESK AND FILE HOLDER FOR USE IN A SEAT

BACKGROUND OF THE INVENTION

1. Field of the Invention

The present invention is a portable desk and cooperative portable file folder holder both of which can be utilized in a seat, such as the seat of an automobile or of a house chair.

2. Description of the Prior Art

Today, many business people spend a great deal of time traveling in and transacting business from a motor vehicle, and thus must carry along many commonly used business items such as file folders containing information on clients and products, maps, writing paper, pens and pencils, calculators, staplers, tape, scissors, portable computers such note book sized computers, and cellular phones for example. When needed, these files and business items must often be retrieved from the vehicle back seat; the vehicle trunk; a disorganized pile of numerous items on the vehicle seat, or from a relatively small brief case, all of which is inconvenient and time consuming.

Many traveling business persons frequently have meetings in offices remote of their vehicle during the work day. Such meetings remote of the vehicle often require files on products and clients, and common business related items to be removed from the vehicle and taken to the meeting, and then taken back to the vehicle. Additionally, many traveling business persons conduct business from vehicles during the day and complete business paper and computer work at night in motels or at home. Such conditions of working from a vehicle during the day and completing the work at night, whether at home or in a motel, as well as the business meetings during the day remote of the vehicle, necessitates relocating some, or all of the business related items and files from the vehicle to the remote site and then later back to the vehicle.

Additionally, business people who spend a great deal of time transacting business from a motor vehicle occasionally desire to access files, maps, writing implements or even a note book computer while in their vehicle, such as while parked in a parking lot, stopped in traffic or when pulled-off the road to perform a brief task such as to make a memo, read a map or prepare for their next meeting.

There is a need for a business person to be able to easily transport files and common business items in a vehicle, and to be able to easily access the items while in the vehicle for use, such as for writing or typing a memo or reading a map, and further wherein the files and business items are stored and organized in a manner allowing the business person to readily relocated all or just some of the items, depending upon the business persons particular needs and desires, to a site remote of the vehicle and then to later re-install the items into the vehicle.

Although related prior art devices have already attempted to address some of these needs, none of the prior art devices are considered to have adequately solved a sufficient number of problems related to being a modern business person whom conducts a substantial amount of business from a motor vehicle.

A search of the prior art did not disclose any devices which are structured identically as the present invention, or which offer the same benefits. The following patents do however disclose related devices which are considered relevant to the present invention, and which exemplify the related prior art devices and the common shortcomings associated therewith:

U.S. Pat. No. 4,949,890, was issued to V. K. Schultz on Aug. 21, 1990, for a Filing, Organizing and Desk Device For Use In Motor Vehicles. Due to structural shortcomings, the Schultz device cannot provide the user all of the use benefits of the present invention. For just one example, the Schultz device does not include or anticipate a file holding structure which is readily disconnectable or removable from the main desk structure to allow the user to easily take an organized group of files (and other select business items) from the vehicle to a meeting, motel room or other location remote of the vehicle.

D. E. Radcliffe was granted U.S. Pat. No. 4,832,241 on May 23, 1989, for Vehicle Portable-Office Organizer. The Radcliffe device like that of Schultz's does not provide a file holding structure which is readily disconnectable or removable from the main desk structure to allow the user to easily take an organized group of files from the vehicle to a meeting or other location remote of the vehicle. The Radcliffe device does include a holder for a closed brief case, and although a brief case normally can hold a small quantity of files and other business related items, the Radcliffe device does not provide or anticipate structuring which supports or secures the files so that when in the vehicle, the driver can readily thumb through a group of files to locate and access a given single file. With the Radcliffe device, the brief case must be stored in the closed state in the desk.

U.S. Pat. No. 4,928,865 was issued May 29, 1990 to B. S. Lorence et al for a Bilateral Beverage Container Holder intended for use in a vehicle. The Lorence et al device is a vehicle armrest comprising a lower housing member which rests upon the vehicle seat, and an upper housing member attached with a hinge to the lower housing member. The upper housing member is pivotally positionable between a lowered or closed position and a raised or open position whereat the upper housing member is generally perpendicular to the lower housing member. Although the Lorence et al device is stated to be for holding beverage containers, games and game pieces, it appears as though it could be used as a small vehicle desk, and thus is believed somewhat relevant.

U.S. Pat. No. 3,345,118 issued Oct. 3, 1967 to D. M. Cummings shows a Desk for Use in Vehicles. The Cummings desk includes a base member having drawers and securement structure for rendering the desk stationary in the front seat area of a vehicle. The Cummings desk additionally includes a horizontally disposed desk top work surface which can be raised by pivoting on hinges to a vertically disposed position to allow access into the desk.

SUMMARY OF THE INVENTION

The following specification and drawings is of a best mode for carrying out the present invention, and for the sake of briefness of this disclosure all changes which could be made within the true scope of the invention have not been herein detailed. The present invention is an improved portable desk and cooperative file folder holder for use in a seat, such as a car seat or kitchen or house chair. When used in a vehicle, the desk and file holder are placed in the passenger seat, preferably the front seat, next to the driver. When used in a house chair, the desk and file holder are placed in the seat of the chair. Generally regardless as to the type of seat the invention is set-up in, the desk provides a stable work surface for writing or keyboarding upon, and the file holder serves to hold files and other small business related items in an organized and easily accessed manner.

The desk includes a horizontally disposed rectangular base member which rests on the seat when in use, and a back member pivotally attached to the base member and which resides vertically disposed adjacent the back rest of the seat when in use. The back member is lockable into the raised position via a locking hinge structure so as not to require belting or other affixment to the seat back rest for support in the vertical position. The back member upon unlocking can be moved from the vertical position to a lowered or about perpendicular position relative to the base member.

The base member serves as the work surface for papers, a writing pad or a note book computer and the like, and to support the back member. The back member, when in the vertical position, serves to removably support and stabilize the file holder on two foldable or hinged arms (brackets) affixed to the back member, the file holder being stabilized over the work surface of the base member. The file holder is at least sized for supporting a plurality of letter size file folders, and preferably up to the U.S. legal size file folders, and may be structured as a properly shaped fabric bag with handles as will be detailed. The file holder is structured and positioned to orient held files so that the file identification tabs commonly at the top of each file are facing the driver seat or driver side of the vehicle, and thus a person sitting in the driver seat can see and reach the identification tabs (files) by looking sideways, and readily thumb through an alphabetized or otherwise organized group of closely adjacent files to access a desired single file, or possibly a map or the like held within the file holder. The file holder preferably includes multiple side pockets for carrying additional small business related items such as calculators, writing implements, a stapler, scissors, tape and the like which are expected to periodically be used in meetings along with the files remote of the vehicle.

The file holder is readily removable from the back member and balance of the desk structure, and is structured with attached carrying handles to be readily transportable along with its contained files and other held business items to a site remote of the vehicle.

The base member which rests on the seat, preferably extends beyond the front edge of the seat where it is further supported and stabilized by a foldable telescopic leg which extends downward from the base member to rest upon the floor. The telescopic leg is preferably widely length adjustable, and to such a length as to allow the portable desk to be set-up on seats of substantially varying heights to the floor. A conventional house or kitchen chair of the type commonly found in homes and motels, has the seat portion further from the floor, when compared to that of a car seat height to the car floor, and the present widely length adjustable telescopic leg allows use of the present portable desk in both a vehicle seat and on a house chair when desired. The use of the stabilizing telescopic leg allows for the base member to be larger than it might otherwise be, extending forward of the front edge of the seat and being prevented from tipping downward by the telescopic leg, thus providing a relatively large and stable work surface.

The present desk may include a lockable storage or utility box affixed permanently or removably to the front-edge bottom surface of the base member within reach of the driver and overhanging the front edge of the seat. The utility box would normally be substantially smaller than the base member so that it may be positioned forward of the front edge of a seat, and additionally in part elevationally lower than the seat, and thus attached to and supported essentially by the forward-edge bottom surface of the base member. The utility box could be used for storing items such a flash light, telephone components, beverage cups and the like. Another feature which is preferably included is a holder for a telephone or telephone hand-set preferably removably connected to the edge of the desk and held within easy reach of the driver of the vehicle. Another feature which is preferably included is a light, preferably a flash light holder with standard flash light which is mountable to hold the flash light adjustably aiming downward at the work surface of the base member in order to light the surface and allow work to be performed thereon or reading in otherwise substantial darkness.

The work surface of the base member is preferably affixed with a slip or slide resistant fabric such as a rubbery material for helping prevent items resting thereon from moving about with movement of the vehicle, and the peripheral edge of three sides of the top surface of the base member surrounding the work surface are preferably affixed with a short vertically extending lip which further prevents items from sliding off. The upper edge of the base member adjacent the driver preferably includes a holder for conveniently holding a beverage container or cup readily accessible to the driver.

When used in a vehicle, the present desk can and should be secured by the lap portion of the vehicle seat belt placed over hinges which connect the base member to the back member, with this to prevent excessive movement of the desk and file holder brought about by movement and forces of the vehicle. When used in a house chair, the desk and file holder are rendered sufficiently stable by the base member resting on the seat, and the telescopic leg resting on the floor slightly outward of the edge of the seat.

The ease at which the file holder removes from the balance of the desk and may be transported is particularly convenient for a traveling business person who has a meeting outside of his car and wishes to take his files and other small business items to the meeting (or motel room/home office) absent having to take the entire desk structure. The desk structure is also readily transportable from the vehicle, being separately portable from the file holder. The portability of the desk allows its convenient set-up and use thereof in a house chair such as in a home or motel. When desired, the file holder can be removed from the desk, and the desk can be removed from the vehicle. The extending members of the desk, such as the telescopic leg and the support arms for holding the file holder, can be repositioned to lay in close proximity to the desk such as by folding, and secured in place with fasteners. The hinge or hinges may be unlocked and the back member folded downward to lay on top of the base member and about perpendicular thereto to form the desk into a suitcase-like unit having an attached carrying handle which allows the desk to be easily transported by hand and stored if desired. The desk in the folded or closed condition is preferably small enough to be storable in an average size car trunk or house or motel closet. The desk is light weight to allow easy hand-carrying by one hand on the attached handle, with the desk preferably weighing under twenty-five pounds. The file holder is transported separately from the desk. A person can readily carrying the desk in one hand, and at the same time the file holder in the other hand, since both include attached handles and are light in weight.

These, as well as other advantages and features of the present invention will become more fully appreciated from a review of the remaining specification and included drawings.

DESCRIPTION OF THE PREFERRED EMBODIMENT

Referring now to the drawings where FIGS. 1 through 5 show the preferred embodiment of portable desk 10 and the cooperative file folder holder 70 which will henceforth simply be referred to as file holder 70. Desk 10 includes the main elements of the generally flat rectangular base member 12, positioned horizontally when in-use, and the generally rectangular back member 14 which is positioned vertically and about perpendicular to base 12 in use shown best in FIGS. 1 and 3. Base member 12 is preferably about 26 inches in length and around 21 inches in width. Back member 14 may be about the same size as base member 12, or as shown in the drawings, may be of about the same width but shorter in length, the shorter length saving material and helping maintain the desk light in weight while still allowing for a relatively long and spacious work surface 26 on the top of base member 12. All dimensions herein given are for example only, and can be altered substantially within the scope of the invention. Base member 12 has a relatively flat bottom surface which rests upon a seat in use and provides a substantial amount of stability to desk 10. Work surface 26 of base 12 provides a generally flat surface on which writing or typing on a small computer may occur.

Base member 12 and back member 14 should be made as relatively rigid structures, and may be made of rigid plastics such as by blow molding, rotational molding or injection molding, or may be made of thermoformed plastic components which are assembled and affixed to one another. The interiors of base 12 and back 14 (not shown) may be solid, but are preferably hollow or filled with a light weight rigid foam. Although materials other than plastics may be utilized to construct base member 12 and back member 14, such as leather covered cardboard for example, plastics are preferred for reasons pertaining to durability, resistance to moisture, weight, and economics in manufacturing.

Back member 14 has two oppositely disposed lengthwise sides 62, a back end 58 and front end 60 oppositely disposed from one another and spanning between the sides 62, and a front surface 64 and an oppositely disposed rear surface 66. Sides 62 are shown somewhat irregular with the right side 62 curving outward near the back end 58 and curving outward on the left side 62 near the front end 60 to accommodate lip 32 on base member 12 when both members 12 and 14 are folded and in the storage position. Rear surface 66 faces the back rest portion of a house chair or of vehicle seat 42 when in use, with front surface 64 facing outward toward the vehicle dashboard (not shown) when used in a vehicle. Base member 12 has two oppositely disposed lengthwise sides 22, front end 20 and back end 18 oppositely disposed from another and spanning between sides 22, and a bottom surface 24 and oppositely disposed work surface 26. One of the sides 22 of base member 12 is affixed with a carrying handle 82 for transporting desk 10 to and from the vehicle. Carry handle 82 is preferably one which can fold downward on attaching hinges much like many suitcases for more compact storage.

Figure 1:
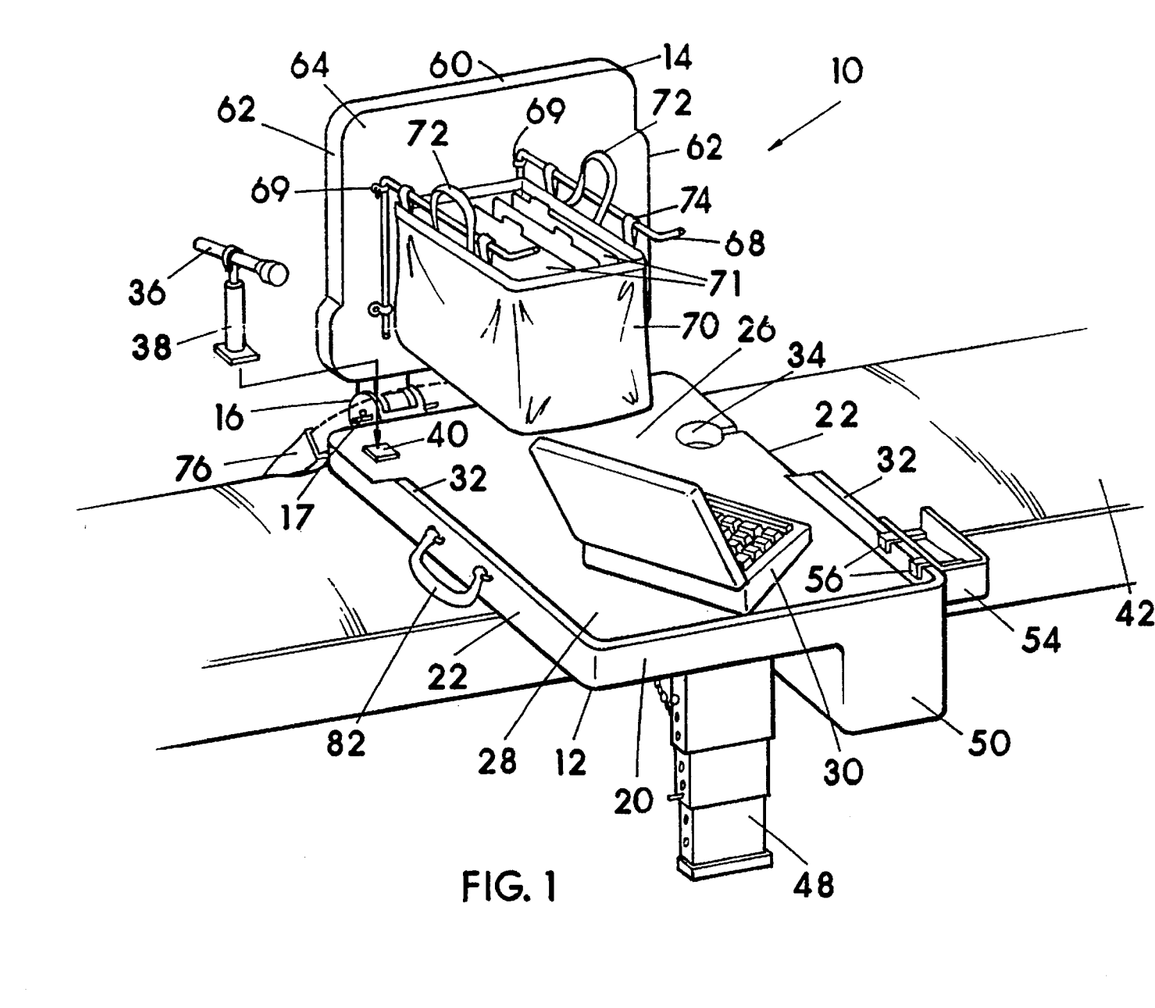
FIG. 1 is a top perspective right side view of a preferred embodiment of the present portable desk and file folder holder in use on the front passenger seat of a vehicle.
Figure 3:
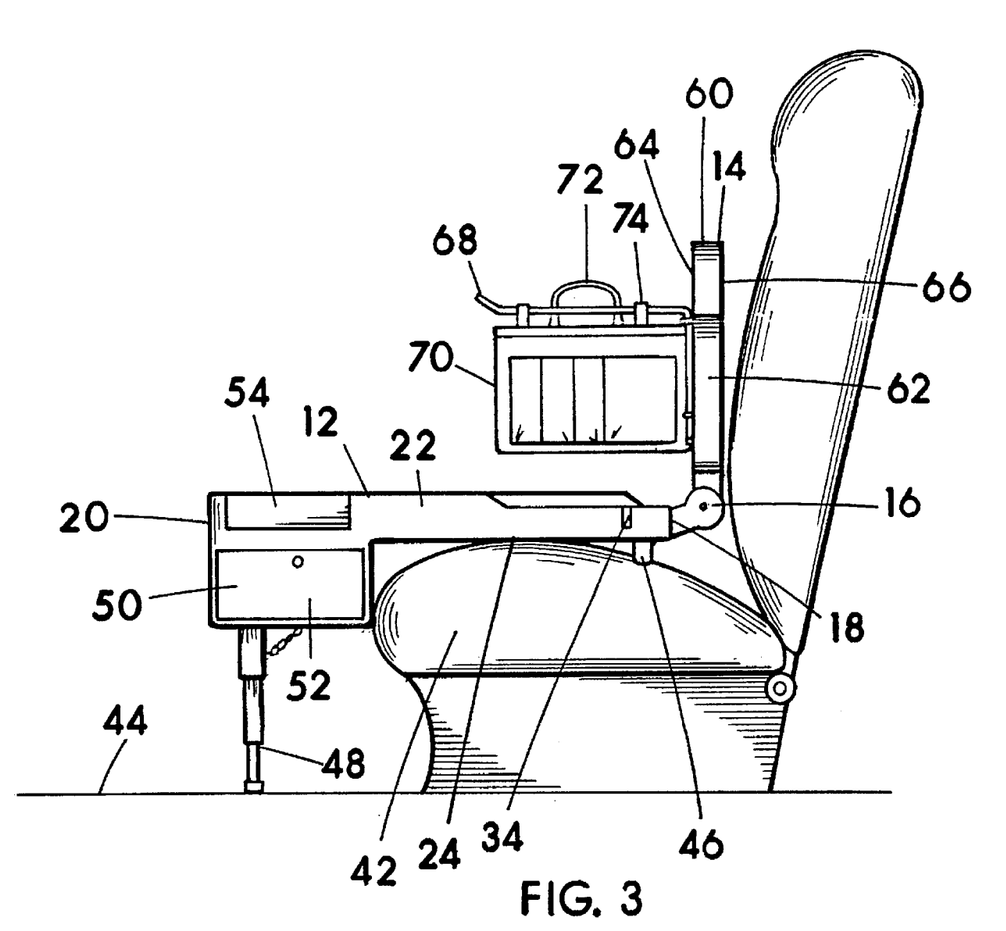
FIG. 3 is left side view of the preferred embodiment of the portable desk and file folder holder on a car seat.
Figure 4:
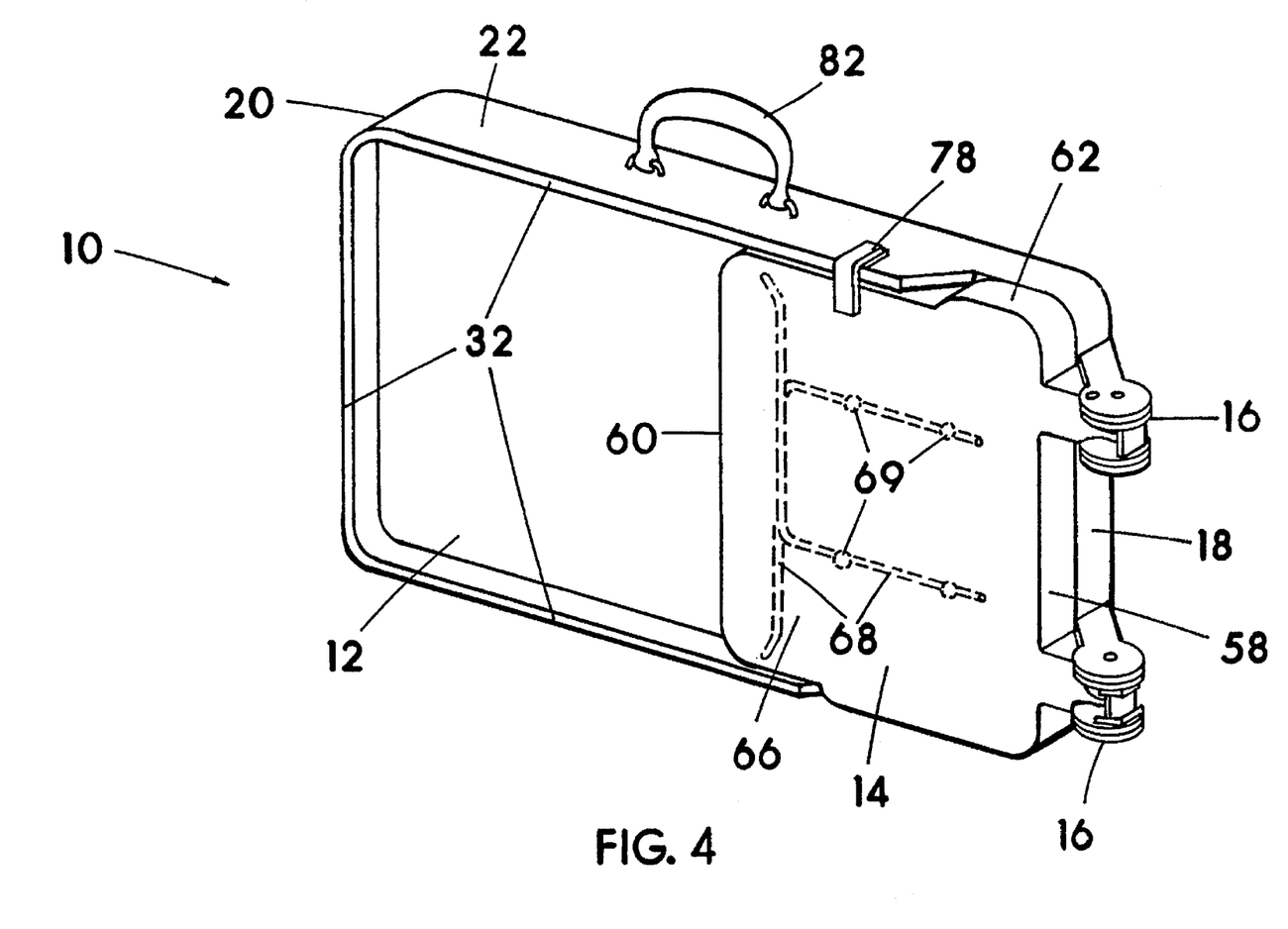
FIG. 4 is a front perspective view of the preferred embodiment of portable desk in the folded stored position. The file folder holder has been removed for separate storage or transporting.

Base and back members 12 and 14 are pivotally affixed to one another by a hinge or hinges 16 spanning between the members 12 and 14 and affixing them together. Hinges 16 are affixed to back end 18 of base member 12 with the opposite side of the hinges being affixed to back end 58 of back member 14 shown best in FIG. 4. One of the hinges 16 includes a lock structure of any suitable type for locking the hinge 16 with the back member 14 in the raised position as shown in FIG. 1. The lock structuring must be unlockable to allow back member 14 to be pivoted downward as shown in FIG. 4. As an example of a lock structure, a removable pin 17 is shown passed through two aligned holes in two respectively movable juxtaposed plates of hinge 16 in FIG. 1. The lock pin 17 when in the holes of the juxtaposed plates renders the plates non-movable relative to one another and the hinge 16 stationary or locked, and the removal of pin 17 frees the hinge for movement. Other locking hinge types may be used, as well as spring detents, or any other suitable structuring to achieve the just described back member lock function within the scope of the invention. Any suitable hinge structure may also be used, and depending upon the materials and manufacturing techniques utilized to manufacture base and back member 12, 14, a living hinge of plastics might effectively and economically be utilized. A suitable lock structure when utilizing a living hinge of plastics in order to maintain back member 14 in the perpendicular position relative to base member 12 could be a prop-style arm (not shown) pivotally connected at one end to the base member and foldable in a downward position for storage, and engagable in a raised position at a second end with the back member 14 to hold it raised. Folding metal hinges which include locking structure such as is very commonly used in brief cases may also be effectively utilized. In the example of the invention shown in the drawings, the hinge structure 16 as shown best in FIGS. 2 and 3 provides a suitable surface over which a vehicle seat belt 76 may be applied so as to secure the desk in a operable and stable position within vehicle seat 42.

Figure 2:
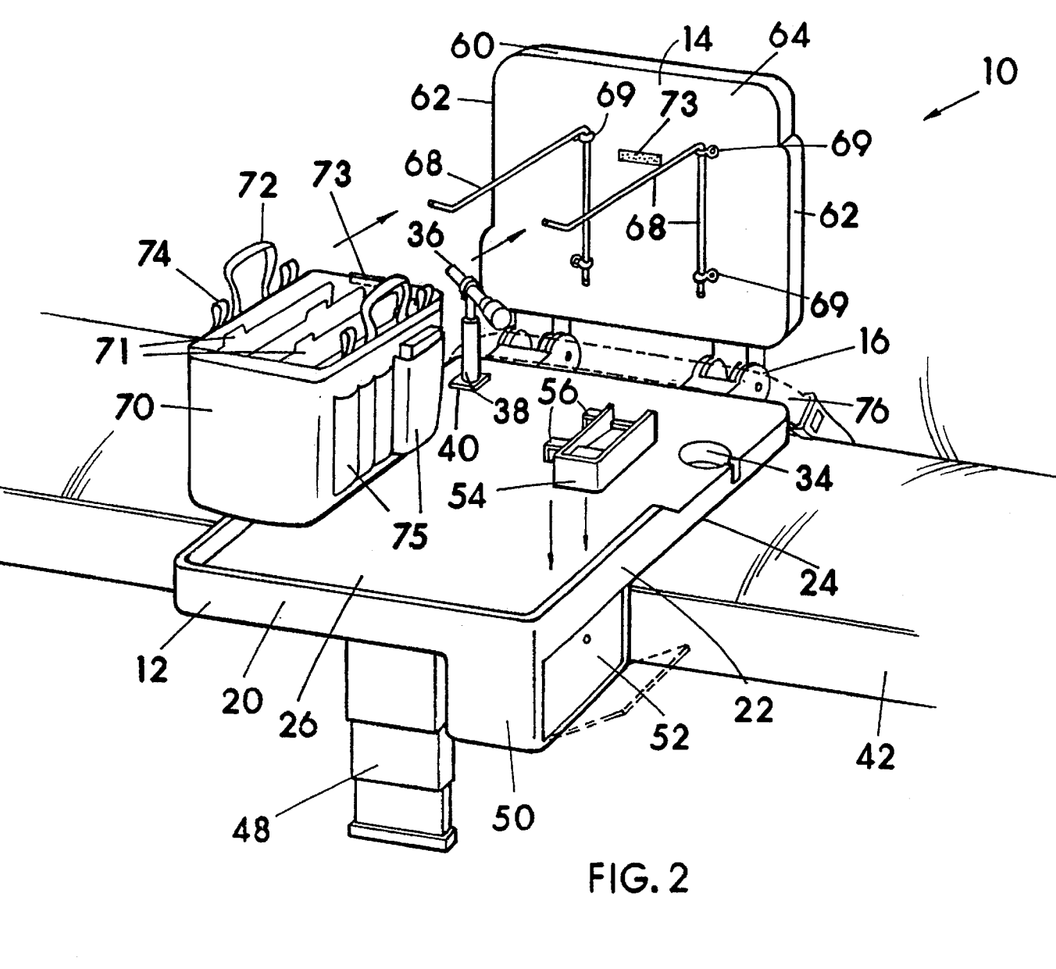
FIG. 2 is a top perspective left side view of the preferred embodiment of portable desk and file folder holder showing the file folder holder removed from the support arms of the back member.

As shown best in FIGS. 1 and 2, front surface 64 of back member 14 is affixed with two pivotally mounted arms 68 which support and stabilize file holder 70, although conceivably within the scope of the invention only a single arm 68 might be used depending upon the precise structure of file holder 70 and how it is supported. Arms 68 are in laterally spaced relationship to one another and in the extending position extend straight outward from surface 64 in the same elevational plane as one another, with this to support the file holder in an open or spread position over work surface 26. Arms 68 in the example shown in FIG. 2 are made of metal rod stock, and are right angled in shape with each having a downward depending portion which is pivotally affixed to front surface 64 by two fittings 69, and a horizontal support portion which is positioned extending outward over base member 12 when in use, and folded against front surface 64 when in the storage position, see FIG. 4 where arms 68 are indicated in broken lines in the folded or stored position. Arms 68 are sufficiently rigid and strong to support and stabilize a relatively heavy file holder 70 suspended over work surface 26 as shown in FIG. 3. I prefer holding file holder 70 upward over work surface 26 with support arms 68 so that small items may rest on work surface 26 underneath file holder 70, and this maximizes the usable work space surface, however, file holder 70 could rest over and upon work surface 26 with support arms 68 being lower than shown and serving to stabilize file holder 70, a situation where conceivably only a single arm 68 might be used simply for stability. Fittings 69 attaching support arms 68 to back member 14 in the example shown are each flexible plastic straps wrapped snugly around the arms 68 and then connected at the strap terminal ends to front surface 64 of back member 14. The connecting of the strap-style fittings 69 to surface 64 may be accomplished with rivets, screws, nut and bolts or other suitably strong and durable fastenings which will render the arms 68 capable of being manually pivotal into the stored or into close proximity position with back member 14 as indicated with phantom broken lines in FIG. 4. Arms 68 in the folded or stored position lay one over the other and in close proximity to surface 64 or about parallel thereto to allow back member 14 to be folded down onto work surface 26 of base member 12. Fittings 69 may be made of metal pivotal connectors similar to hinges, or any other suitable structuring which allows adequate strength in the outward position for holding file holder 70, and which further allows the arms 68 to be re-positioned into the stored position when file holder 70 has been removed therefrom. Arms 68 could be removably supported on back member 14, being in a first extending position for holding file holder 70, and then removable or disengagable from back member 14 for allowing back member 14 to be folded downward onto base member 12, although this is less desirable because fully disengagable items are at risk of being misplaced or lost. The spacing between the two arms 68 is in the example shown about equal to the width of file holder 70, and this being due to file holder 70 in this example being a flexible fabric bag, and the spacing between the arms 68 will hold the file holder bag in an open condition as shown in FIG. 1. Arms 68 are further shown having short up-turned portions on the horizontal distal ends to help prevent file holder 70 from sliding off of the arms 68. Additionally to help prevent file holder 70 from sliding off of the arms 68 such as with movement or braking of a vehicle, cooperative hook and loop fastener 73 strips may be applied one affixed to file holder 70 and releasably engageable with a second portion of the hook and loop 73 affixed and appropriately positioned on surface 64 of back member 14 as shown in FIG. 2.

File holder 70 in the example herein shown and described is a rectangular fabric bag having an open top, a closed bottom end defined by a panel connected to two lengthwise side panels connected to two narrower end panels. A lid or top cover panel could be applied to file holder 70 if desired to able to close the holder to conceal the files and like contents. The fabric file holder 70 is by its nature somewhat flexible, however a rigid file holder such as made of rigid or semi-rigid plastics would be within the scope of the invention.

Two carrying handles 72 are attached to file holder 70, one handle 72 to each lengthwise side panel so that the bag 70 may be carried, and preferably by grasping both flexible handles 72 at once in a single hand which serves to somewhat closed the file holder 70. Also attached to the lengthwise side of file holder 70 are four small fabric connecting loops 74, one on each side of a handle 72. Two of the connecting loops 74 are positioned on each oppositely disposed lengthwise sides of file holder 70 and are sized to slide over each extending arm 68, two of the aligned loops 74 over each arm 68 for connecting the file holder 70 to desk 10. With loops 74 over arms 68, the file holder 70 is supported and is held spread or opened for easy access into the file folders 71 contained within the center main storage area of the holder 70. Once attached to arms 68, the file holder 70 and file folders 71 are positioned lengthwise parallel to the length of the vehicle, or in other words lengthwise facing the driver's seat so that the file identification tabs at the tops of the file folders 71 are facing the driver seat and driver within easy sight and reach of the driver. Carrying handles 72 are used when file holder 70 is manipulated onto or off of arms 68, and when file holder 70 is transported. File holder 70 in this example is substantially longer in length than in width due to the orientation which is desired to hold the contained file folders 71, and the length is Just slightly longer than the file folders 71, and the width being sufficient to hold a plurality of juxtaposed or grouped file folders 71 as indicated in the drawings. The depth of file holder 70 is about the same as the height as the file folders 71, with this to allow the driver to look into the holder to be able to visually read the identification tabs and to thumb through the file folders 71. As shown in FIG. 2, attached side pockets 75 made of sewn fabric are preferably a part of file holder 70 to allow separate storage and transportation of items such as a calculator or writing implements and the like therein, "separate" meaning not thrown in the main compartment holding the file folders 71.

Figure 5:
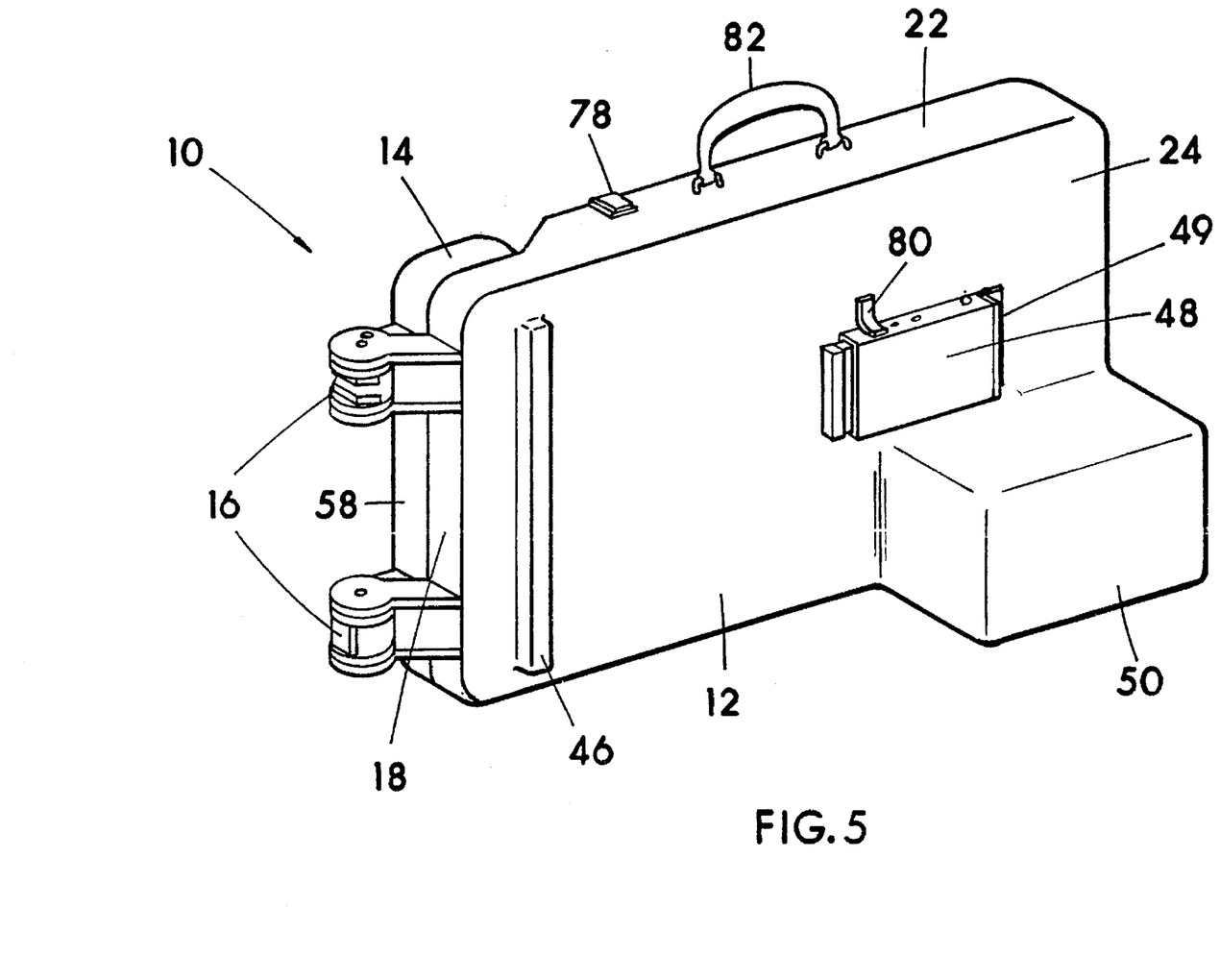
FIG. 5 is a back perspective view of the portable desk in the folded stored position.

In order to aid in supporting desk 10, particularly when base member 12 is substantially long and overhanging the front edge of a seat so as to provide a large work surface 26, telescopic leg 48 is pivotally affixed by hinge 49 adjacent front end 20 on bottom surface 24 of base member 12. Leg 48 extends down to floor 44 of the vehicle to serve as a brace and helps position and maintain work surface 26 in a horizontal position whether on a vehicle or house chair seat. As shown in the drawings, telescopic leg 48 is comprised of multiple cooperative telescopic pieces which are capable of collapsing into one another, three are shown, so as to be widely length adjustable and collapsible to a sufficiently short length as to not extend beyond back end 18 when collapsed and folded. Spring detents or removable lock pins and the like may be used to lock leg 48 in a given length, the locking structure necessarily being disengagable to allow adjustment of the leg 48 length and for collapsing the leg into a short length of placing it into the folded stored position by pivoting on hinge 49. See FIG. 5 to see leg 48 in the collapsed and folded position. In FIG. 5, hook and loop fasteners 80 are shown one part affixed to bottom 24 of base 12 and the second portion attached to leg 48 with the two portions of the hook and loop connected to one another to maintain leg 48 in close proximity to the bottom of the desk 10 for easier storage and transportation. Telescopic leg 48 may be attached to base member 12 with a locking hinge 49 capable of securing the leg extending non-movably and vertically downward so as to not fold under with movement of the vehicle, and locking hinge or like lock structure necessarily being unlockable to allow leg 48 to be folded into the stored position.

Top work surface 26 of base member 12 is covered or textured with a non-slip frictional material 28 such as a rubbery fabric. Work surface 26 may be used to support articles such as books, writing papers or a note book computer 30 with frictional material 28 helping prevent the articles from sliding about. There is a short vertical lip 32 around a portion of the top edge of work surface 26 which further prevents articles from sliding off particularly with a vehicle in motion. Lip 32 extends from adjacent back end 18 on the right side 22 and extends around the front end 20 to approximately midway on the left side 22. Adjacent the end of lip 32 on the left side 22 of work surface 26 is a recessed beverage container holder 34 for holding beverage containers. Beverage container holder 34 is shown having a slit opening through side edge 22 for placement of a coffee mug handle. Adjacent lip 32 on the right side 22 of work surface 26 is located light 36. Light 36 includes a conventional small flashlight which is removably supported on the top of a vertically oriented support stand 38. Support stand 38 is removably affixed on the bottom end to work surface 26 with hook and loop fasteners 40, with light 36 itself being removably affixed to support stand 38, either with a clamp or a strap of hook and loop fasteners or other suitable structuring. Support stand 38 elevates light 36 sufficiently to illuminate articles laying on top surface 26. The attachment structure for securing light 36 to stand 38 preferably includes structuring such as a pivotal connection between the stand top and the hook and loop strap about the flash light for allowing for angular changes in the direction light 36 aims.

As an optional feature, the bottom right edge of bottom surface 24 may be affixed with utility box 50. Utility box 50 extends from front end 20 of base member 12 to adjacent the front edge of car seat 42. As shown best in FIGS. 1 and 5, the utility box 50 does not need to extend across the full front width of desk 10, but can be shallow and leave space to connect telescopic leg 48 directly to bottom surface 24 as shown. Utility box 50 may be permanently affixed or removable from bottom surface 24, and can be accessed by a hinged door 52 which faces the driver. Door 52 may also be locked with a key. Another optional feature includes a removable phone holder 54 for supporting cellular telephones or telephone handsets. Phone holder 54 is removably affixed by hooks 56 over lip 32, preferably above utility box 50 where it is within easy reach of the driver. Another optional feature, which may be positioned on the bottom surface 24 of base member 12 adjacent back end 18 is an elongated rail 46 which serves to compensate for the typical downward curve of a vehicle seat 42 near the seat back rest. Rail 46 shown in use in FIG. 3 may be used to help maintain base member 12 in a more horizontal position particularly when in a vehicle seat 42.

As previously stated, desk 10 and file holder 70 are both easily installed and removed from a vehicle or a house or kitchen chair. If installed in a vehicle seat and it is desirable to remove desk 10 or file holder 70, file holder 70 can quickly and easily be removed from arms 68 by grasping handles 72 and sliding the loops 74 outward and off of arms 68. Desk 10 can then be easily removed from the vehicle by unleashing safety belt 76 from over hinges 16. Arms 68 are folded against front surface 64. Phone holder 54 should be removed prior to folding desk 10 and placed inside utility box 50 along with stand 38 and light 36, if present. Light 36 is removed from its position and any books or articles are removed from work surface 26 of base member 12. The lock holding back member 14 vertically is disengaged, and back member 14 is then folded downward with both surfaces 26 and 64 facing each other. A small hook and loop fastener strap 78, attached on the right side 62 of back member 14, is folded over and affixed to a mating hook and loop fastener member attached on the right side of base member 12 to hold the members 12 and 14 closed against one another. Desk 10 may then be grasped and removed from the vehicle, at which point leg 48 is collapsed and folded against the bottom surface 24 of base member 12 where it is also retained by a hook and loop fastener strap 80. Desk 10 is now ready for easy transportation by grasping handle 82 in one hand. File holder 70 may be easily carried in the other hand.

Although I have very specifically described the preferred structures and use of the invention by way of example, it should be understood that some changes in the specific structures described and shown in my drawings may clearly be made without departing from the true scope of the invention in accordance with the appended claims.

What I claim as my invention:

1. A portable desk and portable file holder combination for use in a seat, comprising:

a desk having a base member including a bottom surface for resting on a seat and at least in part stabilizing said desk on a seat; an oppositely disposed surface from said bottom surface of said base member being a surface for serving as a desk work surface;

a file holder a back member attached to said base member by hinge means rendering said back member selectively positionable between a first position vertically raised and extending generally perpendicular relative to said base member for stabilizing said file holder, and a second position vertically lowered and extending generally parallel relative to said base member for storage and transportation of said desk;

handle means attached to said desk for allowing the desk to be transported by hand;

file holder support means attached to said desk for stabilizing said file holder relative to said desk and over said desk work surface;

said file holder including a generally rectangular container sized in length for containing file folders lengthwise parallel to the file holder length, said file holder sized in width for containing a plurality of the file folders stacked against one another;

said file holder including connecting means attached thereto for connecting the file holder to said file holder support means whereby said file holder can be engaged with said desk and stabilized; said connecting means being disconnectable from said file holder support means for allowing removal of said file holder and transportation of said file holder by file holder handle means attached to said file holder for allowing the file holder to be carried separate from said desk; said file holder including an open top for revealing file identification tabs of file folders within the file holder so that file folders within the file holder can be visually identified and accessed with said file holder engaged with said desk.

2. A portable desk and portable file holder combination for use in a seat, comprising:

a desk having a base member including a bottom surface for resting on a seat and at least in part stabilizing said desk on a seat; an oppositely disposed surface from said bottom surface of said base member being a surface for serving as a desk work surface;

a file holder;

a back member attached to said base member by hinge means rendering said back member selectively positionable between a first position vertically raised and extending generally perpendicular relative to said base member, and a second position vertically lowered and extending generally parallel relative to said base member;

handle means attached to said desk for allowing the desk to be transported by hand;

file holder support means attached to said desk for stabilizing said file holder relative to said desk, said file holder support means including at least one elongated arm attached to said back member by pivotal attachment means for allowing said at least one elongated arm to be positioned extending perpendicularly outward from a front surface of said back member and over said desk work surface of said base member in a file holder stabilizing position, the pivotal attachment means further for allowing pivotal movement of said at least one elongated arm into close proximity to said front surface of said back member and into a stored position;

said file holder including a generally rectangular container sized in length for containing file folders lengthwise parallel to the file holder length, said file holder sized in width for containing a plurality of the file folders stacked against one another;

said file holder including connecting means attached thereto for connecting the file holder to said at least one elongated arm in the perpendicularly outward position whereby said file holder can be engaged with said desk and stabilized; said connecting means being disconnectable from said at least one elongated arm for allowing removal of said file holder and transportation of said file holder by file holder handle means attached to said file holder for allowing said file holder to be carried separate from said desk; said file holder including an open top for revealing file identification tabs of file folders within the file holder so that file folders within the file holder can be visually identified and accessed with said file holder engaged with said desk.

3. A portable desk and portable file holder combination for use in a seat of a motor vehicle, comprising:

a desk having a base member including a bottom surface for resting on and at least in part stabilizing said desk on a passenger seat adjacent a driver's seat of a motor vehicle; an oppositely disposed surface from said bottom surface of said base member being a surface for serving as a desk work surface;

a file holder;

a length adjustable telescopic leg attached to a front portion of said base member and extendable in a downward direction to rest upon a floor to further stabilize said desk;

a back member attached to said base member by hinge means rendering said back member selectively positionable between a first position vertically raised and extending generally perpendicular relative to said base member, and a second position vertically lowered and extending generally parallel relative to said base member;

delatchable lock means for securing said back member in said first position;

handle means attached to said desk for allowing the desk to be transported by hand;

file holder support means attached to said desk for stabilizing said file holder relative to said desk, said file holder support means including at least one elongated arm attached to said back member by pivotal attachment means for allowing said at least one elongated arm to be positioned extending perpendicularly outward from a front surface of said back member and over said desk work surface of said base member in a file holder stabilizing position, the pivotal attachment means further for allowing pivotal movement of said at least one elongated arm into close proximity to said front surface of said back member and into a stored position;

said file holder including a generally rectangular container sized in length for containing file folders lengthwise parallel to the file holder length, said file holder sized in width for containing a plurality of the file folders stacked against one another;

said file holder including connecting means attached thereto and oriented for connecting the file holder to said at least one elongated arm in the perpendicularly outward position and for stabilizing said file holder lengthwise facing the driver's seat; said connecting means being disconnectable from said at least one elongated arm for allowing removal of said file holder and transportation of said file holder by file holder handle means attached to said file holder for allowing said file holder to be carried separate from said desk; said file holder including an open top for revealing file identification tabs of file folders within the file holder so that file folders within the file holder can be visually identified and accessed with said file holder engaged with said desk.

4. A portable desk and portable file holder combination according to claim 3 wherein said file holder includes a plurality of side pockets to allow storage and transportation of small business related items such as calculators and writing implements within the side pockets.

* * * * *